United States Patent
Papa et al.

(10) Patent No.: US 10,849,019 B2
(45) Date of Patent: *Nov. 24, 2020

(54) SYSTEMS AND METHODS FOR PROVIDING LTE-BASED BACKHAUL

(71) Applicant: Parallel Wireless, Inc., Nashua, NH (US)

(72) Inventors: Steven Paul Papa, Windham, NH (US); Rajesh Kumar Mishra, Westford, MA (US); Kaitki Agarwal, Westford, MA (US); Sridhar Donepudi, Nashua, NH (US); Sumit Garg, Hudson, NH (US); Kartik Shashikant Raval, Pune (IN); Prashanth Rao, Wilmington, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/220,960

(22) Filed: Dec. 14, 2018

(65) Prior Publication Data
US 2019/0141575 A1 May 9, 2019

Related U.S. Application Data

(63) Continuation of application No. 15/202,496, filed on Jul. 5, 2016, now Pat. No. 10,165,467, which is a (Continued)

(51) Int. Cl.
*H04W 28/10* (2009.01)
*H04B 1/3816* (2015.01)
(Continued)

(52) U.S. Cl.
CPC .......... *H04W 28/10* (2013.01); *H04B 1/3816* (2013.01); *H04L 12/4633* (2013.01);
(Continued)

(58) Field of Classification Search
CPC ..... H04W 28/10; H04W 80/00; H04W 88/08; H04L 12/4633; H04L 12/66
See application file for complete search history.

(56) References Cited

U.S. PATENT DOCUMENTS 8,170,544 B1   5/2012   Satapathy et al.
8,532,074 B2 *  9/2013  Navda ............... H04W 52/0203
                                                           370/338

(Continued)

*Primary Examiner* — Walli Z Butt
*Assistant Examiner* — Ryan C Kavleski
(74) *Attorney, Agent, or Firm* — Michael Saji; David W. Rouille

(57) ABSTRACT

Systems and methods are disclosed for enabling a mesh network node to switch from a base station role to a user equipment role relative to a second mesh network node, and vice versa. By switching roles in this manner, the mesh network node may be able to benefit from increased uplink or downlink speed in the new role. This role reversal technique is particularly useful when using wireless protocols such as LTE that are asymmetric and allow differing throughput on uplink and downlink connections. Methods for determining whether to perform role reversal are disclosed, and methods for using role reversal in mesh networks comprising greater than two nodes are also disclosed.

17 Claims, 6 Drawing Sheets

Related U.S. Application Data continuation-in-part of application No. 14/453,365, filed on Aug. 6, 2014, now Pat. No. 9,386,480.

(60) Provisional application No. 61/926,675, filed on Jan. 13, 2014, provisional application No. 61/862,688, filed on Aug. 6, 2013.

(51) Int. Cl.
| | |
|---|---|
| *H04L 29/12* | (2006.01) |
| *H04L 12/46* | (2006.01) |
| *H04L 12/66* | (2006.01) |
| *H04W 80/00* | (2009.01) |
| *H04W 88/08* | (2009.01) |
| *H04W 76/12* | (2018.01) |
| *H04W 84/20* | (2009.01) |
| *H04W 88/02* | (2009.01) |

(52) U.S. Cl.
CPC ......... *H04L 12/66* (2013.01); *H04L 61/2592* (2013.01); *H04W 76/12* (2018.02); *H04W 80/00* (2013.01); *H04W 84/20* (2013.01); *H04W 88/02* (2013.01); *H04W 88/08* (2013.01)

(56) References Cited

U.S. PATENT DOCUMENTS

| | | | |
|---|---|---|---|
| 9,078,286 B1* | 7/2015 | Yuan | H04W 88/085 |
| 2013/0059585 A1* | 3/2013 | Giloh | H04W 72/0406 |
| | | | 455/436 |
| 2013/0163508 A1* | 6/2013 | Yu | H04W 16/14 |
| | | | 370/315 |
| 2013/0229910 A1 | 9/2013 | McKnight, Jr. et al. | |
| 2014/0254468 A1 | 9/2014 | Raaf et al. | |
| 2014/0357224 A1 | 12/2014 | Walley et al. | |
| 2016/0007273 A1 | 1/2016 | Farid et al. | |
| 2016/0295449 A1 | 10/2016 | Seenappa et al. | |
| 2017/0374669 A1 | 12/2017 | Kahtava et al. | |
| 2018/0054342 A1* | 2/2018 | Nory | H04L 5/0053 |

\* cited by examiner

SYSTEMS AND METHODS FOR PROVIDING LTE-BASED BACKHAUL

CROSS-REFERENCE TO RELATED APPLICATIONS

This application is a continuation of, and claims the benefit of an earlier filing date under 35 U.S.C. § 120 based on, U.S. patent application Ser. No. 15/202,496, filed on Jul. 5, 2016, entitled "Systems and methods for Providing LTE-Based Backhaul", which itself is a continuation in part of, and claims the benefit of an earlier filing date under 35 U.S.C. § 120 based on, U.S. patent application Ser. No. 14/453,365, filed on Aug. 6, 2014, entitled "Systems and Methods for Providing LTE-Based Backhaul," which itself claims priority to the following U.S. Provisional patent Applications: U.S. Provisional Patent Application No. 61/862,688, filed Aug. 6, 2013 entitled "Uplink and Downlink Role Reversal," and U.S. Provisional Pat. App. No. 61/926,675, filed Jan. 13, 2014 and also entitled "Uplink and Downlink Role Reversal," each of which are hereby incorporated by reference herein in their entirety for all purposes.

TECHNICAL FIELD

This disclosure relates to wireless base stations and mesh networks. More specifically, this disclosure relates to the use of asymmetric uplink and downlink connections to and from base stations in a wireless mesh network.

BACKGROUND

Wireless networks are typically architected with multiple base stations, each with a coverage area. Within each coverage area, mobile nodes, such as mobile phones or user equipments (UEs), may attach to the base stations and may be said to be associated with the base stations to which they are attached. Communications between base stations and attached UEs may provide access capability to attached UEs, and may be asymmetric, i.e., having different downlink and uplink speeds.

Wireless networks may also be architected with base stations organized in a mesh network. Such mesh base stations may connect to one another wirelessly to route traffic from mesh base stations that are stationed far from a high-bandwidth core network connection to mesh base stations that are closer to such connections. The use of such routing functionality among mesh base stations may thus be used to provide backhaul, i.e., connectivity to a core network and/or the public Internet, using a backhaul connection that is shared among multiple mesh base stations. When the mesh base stations are configured to be mobile or vehicle-mounted, a complete ad-hoc wireless network may be created in a short time, without the time and expense required for a typical fixed wireless network deployment, by using mobile mesh base stations configured to route traffic to the mesh base station with the shared backhaul connection.

However, there is a need for more-efficient wireless protocols for communication between mesh base stations that are designed for shared backhaul connections.

SUMMARY

Systems and methods are disclosed for enabling a mesh network node to switch from a base station role to a user equipment role relative to a second mesh network node, and vice versa. By switching roles in this manner, the mesh network node may be able to benefit from increased uplink or downlink speed in the new role. This role reversal technique is particularly useful when using wireless protocols such as LTE that are asymmetric and allow differing throughput on uplink and downlink connections. Methods for determining whether to perform role reversal are disclosed, and methods for using role reversal in mesh networks comprising greater than two nodes are also disclosed.

DETAILED DESCRIPTION

Mesh Networks

Figure 1:
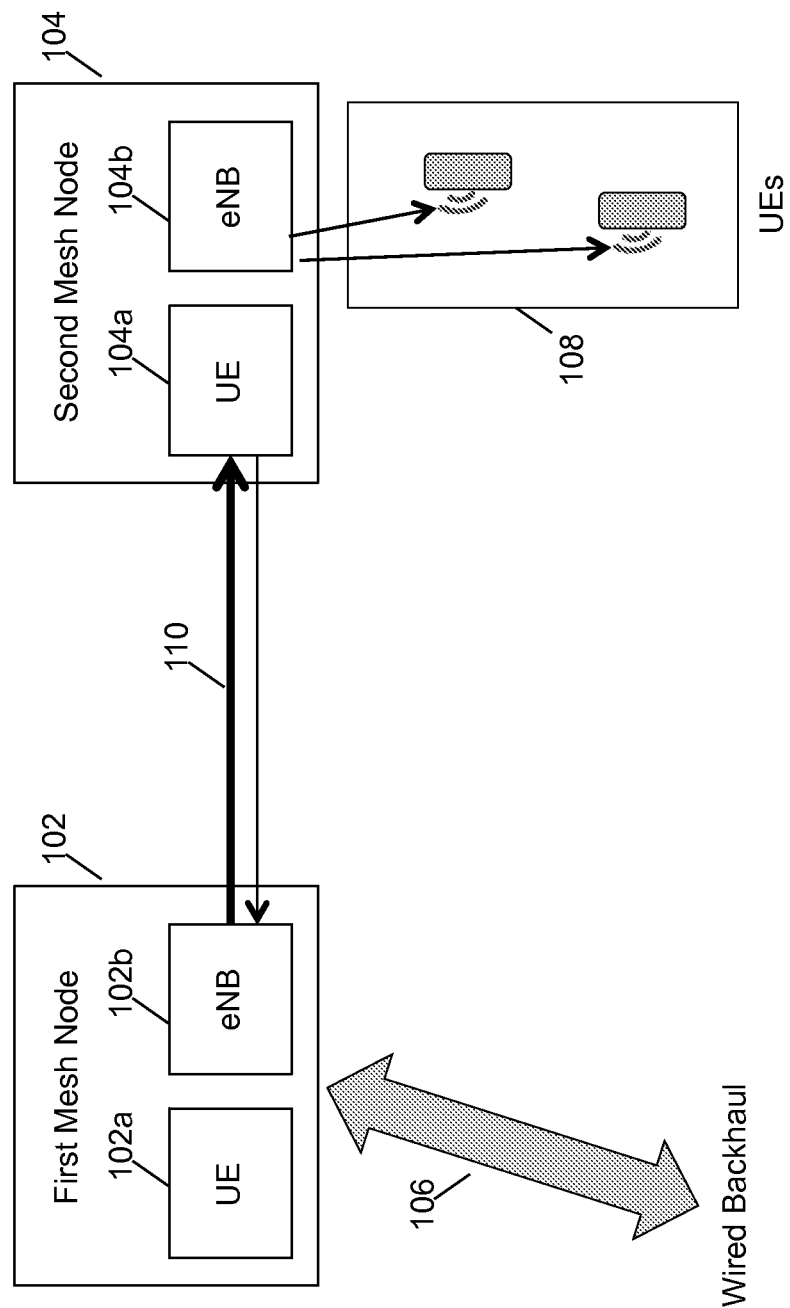
FIG. 1 is a schematic diagram of a first network configuration depicting the use of a wireless network for backhaul, in accordance with some embodiments.

The present application is related to mesh networks. A mesh network is a network in which each node of the network contributes to the formation of a network by routing network traffic to the appropriate node. A mesh network may be enhanced by the use of heterogeneous network nodes that each incorporate multiple radio access technologies (RATs). Additionally, a mesh network may be enhanced by the use of network nodes that self-organize without the coordination of a master node.

A mesh network may be used to provide cellular voice and data capabilities by using base stations that are also mesh network nodes. Cellular data terminals and cellular phones (collectively "user equipments," or UEs) may connect to the base stations to obtain services. The connected UEs need not be mesh network nodes. Allowing UEs to attach to, or associate with, a base station is also known as access functionality, because the base stations are capable of providing access for the attached UEs to the broader network.

Mesh network nodes may be connected together to provide network services to each other, such as for peer-to-peer services or voice calls among handsets within the mesh network. However, it is common for mesh network nodes to also have a connection to another network, such as the public Internet, or to a private telecom operator's network, enabling UEs connected to the mesh network nodes to establish connections with UEs on other networks. A connection to such an outside network is called a backhaul connection.

Mesh networks have many advantages. One advantage is resiliency; when the mesh network nodes are capable of independently performing routing, no single node is indispensable for providing network services. Another advantage is flexibility; the network may be reconfigured by adding or subtracting mesh network nodes to meet various usage scenarios. Another advantage is ease of setup, particularly for self-organizing nodes; since all nodes are involved in routing, no specific configuration of routes, links, or backhaul connections need be put into place before the establishment of a mesh network. Various topologies may be contemplated for mesh network nodes in the field, including a daisy chain (nodes are connected to two other nodes in a chain) or web topology. A mesh network wherein each of the mesh network nodes is mobile offers all of the above advantages, with the additional advantage that such a mesh network may be rapidly deployed by sending mobile mesh base stations into the field.

Such a mesh network may be used to provide Long Term Evolution (LTE) voice and data services, in some embodiments. When providing LTE services, the mesh network nodes may provide evolved NodeB (eNB or eNodeB) base station functionality, and the user equipments (UEs) may be LTE UEs. A mesh network providing LTE services may include several mesh network nodes, each with eNodeB functionality. When combined with the SON and mobile base station aspects described above, a LTE network may be rapidly deployed in an area without cellular coverage by positioning several vehicle-mounted mesh network nodes throughout the area as needed.

A backhaul connection is typically needed to provide connectivity to an Evolved Packet Core (EPC) in order to provide full LTE access functionality. The backhaul connection may be provided via a wired network connection, such as a fiber, Ethernet, or cable-based network connection. Alternately, the backhaul connection may be provided by a wireless connection, such as a line-of-sight (LOS) microwave or radio frequency (RF) connection, a Wi-Fi connection, or an LTE connection. A single backhaul connection may be shared among all mesh network nodes, in some embodiments. Some methods for sharing a backhaul connection are described below, in accordance with some embodiments.

The LTE Protocol

The LTE protocol is an air interface protocol and network stack defined by the $3^{rd}$ Generation Partnership Project (3GPP). Different global regions and wireless operators are assigned different usable frequency bands. LTE is an Internet protocol (IP)-based architecture, and incorporates standards for user equipments (UEs) and eNodeB base stations, as well as the functionality and architecture of the core network. Typically, within the core network are the mobility management entity (MME) for managing UEs, the packet gateway (PGW) for providing IP-based access to different packet data networks, the serving gateway (SGW) for serving as a mobility anchor, the home subscriber server (HSS) for storing authentication and user-related information, and other entities. The PGW typically provides limited access to the public Internet. Further information about LTE may be found in the 3GPP standard, Release 8 and following.

LTE bands assigned to carriers are paired, such that each carrier uses a downlink band and a paired uplink band, each of equal bandwidth. The LTE air interface uses access control protocols, including orthogonal frequency division multiple access (OFDMA) for downlink, and single-carrier frequency division multiple access (SC-FDMA) for the uplink, to conserve power. Two duplexing schemes, frequency division duplexing (FDD) and time division duplexing (TDD), are also used in conjunction with these access control schemes. As OFDMA is a multi-carrier transmission scheme and SC-FDMA is a single-carrier transmission scheme, it follows that, given the same amount of power for a given carrier, the LTE air interface is asymmetric, i.e., it provides greater bandwidth for downlink communications relative to uplink communications. The differentiation between downlink and uplink is informed by the assumption that unlike mobile devices that are limited in processing power and radio output power, cellular base stations have orders of magnitude more processing power, in many cases more than one antenna, and the ability to broadcast at higher power, such that higher speeds on the downlink channel are possible within the downlink frequency band. Current versions of LTE may provide up to 150 Mbps downlink and 75 Mbps at peak. However, while the LTE air interface is described, other asymmetric network connections may also be used with the methods disclosed herein.

When a UE is activated, it may perform a sniffing procedure to search for a broadcast message from a nearby eNodeB to connect to. This broadcast message typically includes radio resource configuration information, including identification of a radio frequency used between the broadcasting eNodeB and UEs attached to the eNodeB. Once an appropriate eNodeB is identified, the UE may send an attach request message to the eNodeB, including identifying information such as an international mobile station equipment identity (IMEI). The eNodeB determines whether it is capable of accepting the attach request, and if so, it connects to the MME and SGW to authenticate the user and set up IP connectivity. The MME is responsible for accessing the user information in the HSS for authentication purposes. IP connectivity is granted to a UE by the SGW, which creates and stores UE contexts and IP bearers for the UE, and indicates to the core network that IP traffic for the UE may be sent to the particular eNodeB. Once the UE is authenticated and the bearer is set up, the eNodeB sends a confirmatory response to the attach request to the UE, resulting in a completed connection. The UE may periodically send measurement reports to the base station subsequent to connection, indicating the radio frequency strength of the base station's signal (and other base stations' signals). Further information regarding UE attach behavior is available in 3GPP TS 23.401 and other 3GPP technical standards.

Asymmetric Connections Between Mesh Nodes

In the context of this disclosure, for a data terminal using a wireless modem, the uplink direction is defined to mean the direction from a data terminal to a base station, and the downlink direction to mean the direction from the base station to the data terminal. An LTE data terminal may be a user equipment (UE), and an LTE base station may be an eNodeB. This corresponds with the usage of these terms in the LTE specification, as well as with a typical usage scenario in which a user "downloads" data from the network to his or her handset, and "uploads" data such as email attachments from his or her handset to the network. In the case of a role reversal, the source and destination nodes for the "uplink" and "downlink" connections may change, but the terminology will be used as described in this paragraph. Note that in many cases, the devices described herein may be mobile and may include both a data terminal and a base station functionality.

While a UE and an eNodeB are typically considered to be specific hardware devices, in some embodiments of this disclosure, the functionality embodied within the UE and eNodeB may be considered to be "roles." By inclusion of both UE and eNodeB hardware, software, and/or functionality within a single mesh network node, a given node may be enabled to use two roles at the same time, or to use either role as needed. Switching between roles may also be enabled.

FIG. 1 is a schematic diagram of a first network configuration depicting the use of a wireless network for backhaul, in accordance with some embodiments. In the case where the mesh network node 102 is connected to another, second mesh network node 104 via an LTE connection 110, and the first mesh network node is also connected to a wired fiber backhaul connection 106, such as a fiber-optic connection, it follows that the second mesh node should share the fiber-optic backhaul of the first mesh node. In the case that the second mesh node 104 has a number of UEs 108 attached to it, and that these UEs are requesting primarily downloads, the second mesh node 104 requires greater bandwidth in the downlink direction. In this case, the LTE connection 110 between the first mesh node 102 and the second mesh node 104 should be set up to prioritize data traffic from the first mesh node to the second mesh node (i.e., downloads).

First mesh network node 102 includes UE functionality 102a and eNodeB functionality 102b. Second mesh network node 104 also includes UE functionality 104a and eNodeB functionality 104b. The aforementioned download prioritization may be achieved by using the second mesh node's UE functionality 104a to connect to the first mesh node's eNodeB functionality 102b, which results in a higher-bandwidth downlink channel and a lower-bandwidth uplink channel being created as shown by LTE connection 110. Data requests from the UEs 108 are forwarded from the second mesh node 104 to the first mesh node 102 and serviced via the fiber backhaul connection 106. The asymmetric nature of the LTE connection results in greater download capacity than upload capacity for the UEs.

Figure 2:
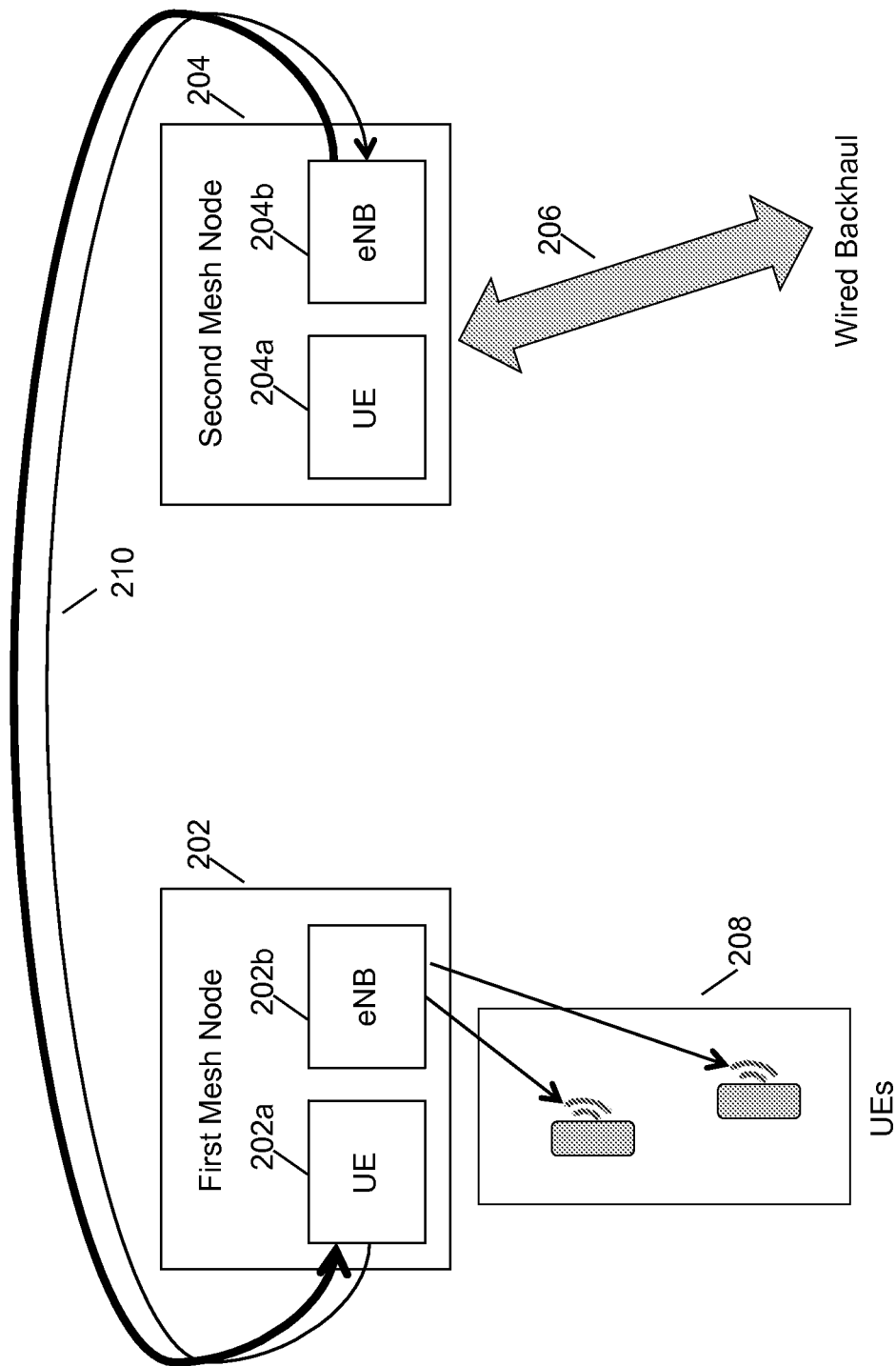
FIG. 2 is a schematic diagram of a second network configuration depicting the use of a wireless network for backhaul, in accordance with some embodiments.

FIG. 2 is a schematic diagram of a second network configuration depicting the use of a wireless network for backhaul, in accordance with some embodiments. In the case where a first mesh network node 202 is connected to UEs 208 and to a second mesh network node 204, and fiber backhaul 206 is connected to the second mesh network node, the first mesh node may connect as a UE using UE functionality 202a to the second mesh node's eNodeB functionality 204b to share the second mesh node's backhaul on behalf of UEs 208, with the LTE connection 210 being faster in the downlink direction from the second mesh node to the first mesh node.

Figure 3:
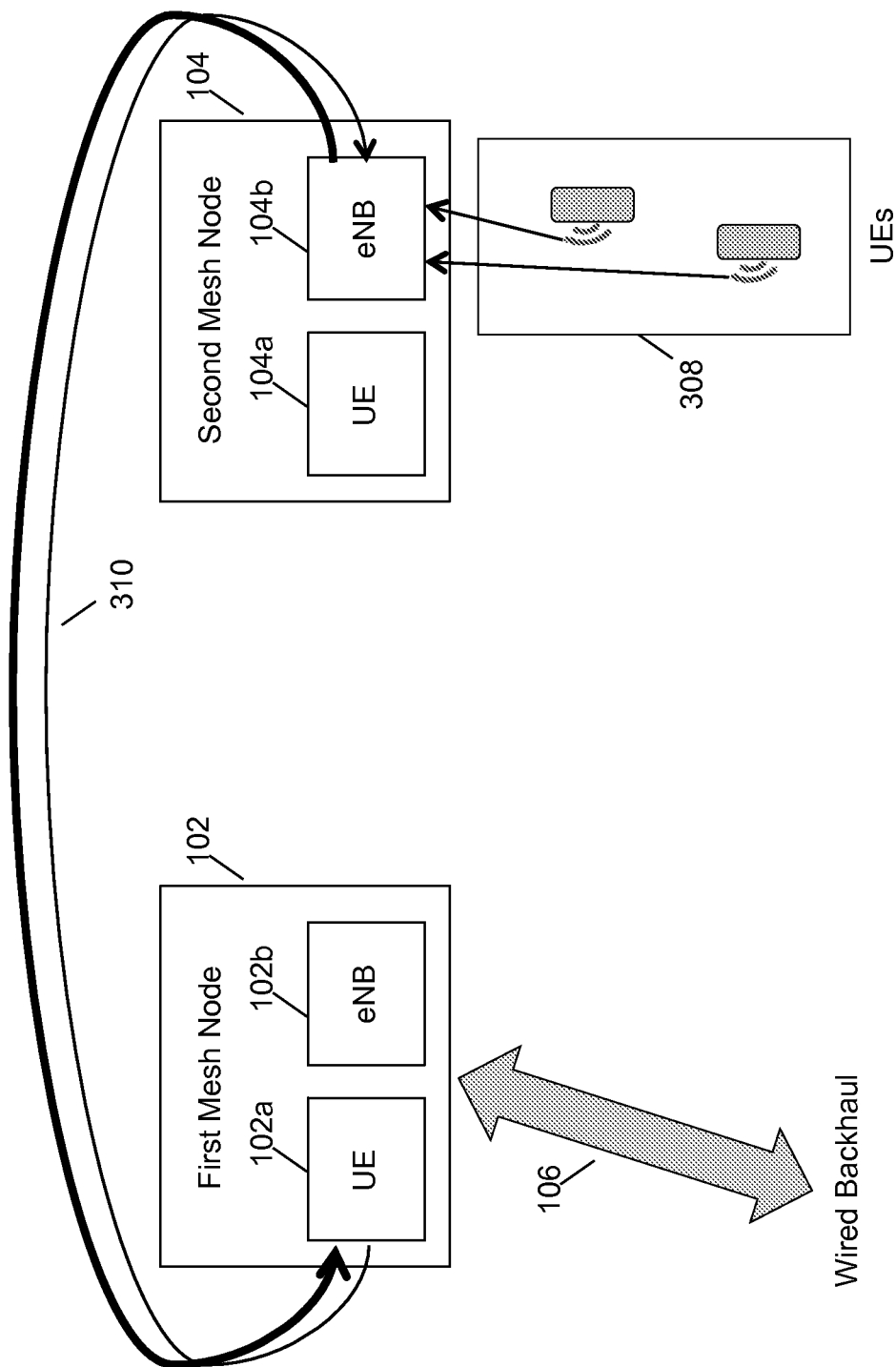
FIG. 3 is a schematic diagram of a third network configuration depicting a role reversal along with the use of a wireless network for backhaul, in accordance with some embodiments.

FIG. 3 is a schematic diagram of a third network configuration depicting a role reversal along with the use of a wireless network for backhaul, in accordance with some embodiments. In the case where a first mesh network node 102 is connected to a second mesh network node 104, and fiber backhaul 106 is connected to the first mesh network node, and UEs 308 are connected to the second mesh node, as in the first example, but where instead the attached UEs require greater uplink traffic than downlink traffic, the direction of the LTE connection 310 may be reversed. For example, if all the UEs 308 are simultaneously sending email attachments, it may be useful to have greater uplink bandwidth than downlink bandwidth. In this case, the first mesh node 102 may use its UE functionality 102a to connect to the eNodeB functionality 104b of the second mesh node 104 to set up an asymmetric LTE connection 310 that is faster in the uplink direction. The first mesh network's backhaul 106 is still used to connect to the outside network. In the case that LTE connection 310 is now set up in the opposite direction, this may be described as a role reversal, in accordance with some embodiments.

In some embodiments, more than one of these cases may occur within a brief time period. To provide prioritization for both upload and download traffic at different times, either the first or the second mesh node may be enabled to dynamically switch between the two roles based on traffic conditions at a given time. In the present disclosure, the UE functionality and the eNodeB functionality may be considered to be roles that may be simultaneously adopted by a single mesh node, and that may be subject to switching and coordination. Additionally, combinations with more than two functionalities may be supported, in some embodiments, e.g., multiple eNodeB functionalities may be provided for a single network node.

In further embodiments, another network configuration may be supported in which LTE relay functionality is supported by one or both of nodes 102 and 104. Relay functionality is described in 3GPP TS 36.216, Release 10, which is hereby incorporated herein in its entirety. Either LTE relay functionality or the paired UE-eNodeB method described herein, or both, may be used to provide backhaul, in some embodiments.

Previous implementations separated radio resources allocated to access and backhaul, and did not allow them to be reallocated. By contrast, this method may provide increased flexibility for the mesh nodes, allowing them to be used with greater efficiency in a number of different situations, and with a variety of backhaul configurations. Reduction of resource use and tunneling cost may also be achieved throughout, which may be substantial when considered over a plurality of mesh network nodes.

Physical Device

Figure 4:
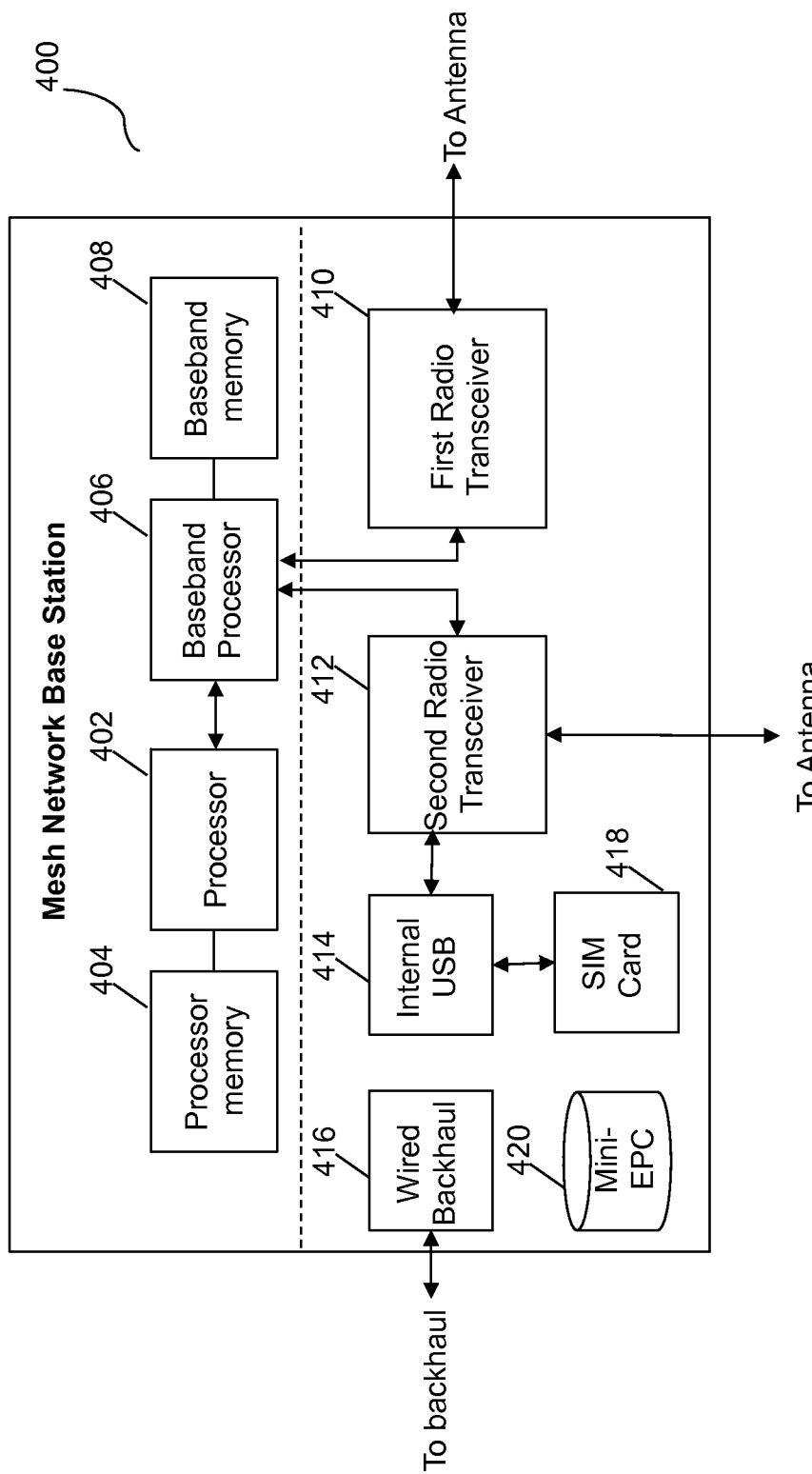
FIG. 4 is a block diagram of an exemplary base station, in accordance with some embodiments.

A physical device for use with the methods described herein is disclosed in connection with FIG. 4.

FIG. 4 depicts a block diagram of an exemplary base station, in accordance with some embodiments. Mesh network base station 400 may include processor 402, processor memory 404 in communication with the processor, baseband processor 406, and baseband processor memory 408 in communication with the baseband processor. Base station 400 may also include first radio transceiver 410 and second radio transceiver 412, internal universal serial bus (USB) port 414, and wired backhaul connection 416. A subscriber information module card (SIM card) 418 may be coupled to USB port 414. In some embodiments, the second radio transceiver 412 itself may be coupled to USB port 414, and communications from the baseband processor may be passed through USB port 414. A mini-evolved packet core (EPC) module 420 may also be included for authenticating users and performing other EPC-dependent functions when no backhaul link is available at all. Other elements and/or modules may also be included, such as a home eNodeB, a local gateway (LGW), a self-organizing network (SON) module, or another module. Additional radio amplifiers, radio transceivers and/or wired network connections may also be included. Device 400 may also be identified as a converged wireless station (CWS) or unified radio access network (UniRAN), in some embodiments.

Processor 402 and baseband processor 406 are in communication with one another. Processor 402 may perform routing functions, and may determine if/when a switch in network configuration is needed. Baseband processor 406 may generate and receive radio signals for both radio transceivers 410 and 412, based on instructions from processor 402. In some embodiments, processors 402 and 406 may be on the same physical logic board. In other embodiments, they may be on separate logic boards.

The first radio transceiver 410 may be a radio transceiver capable of providing LTE eNodeB functionality, and may be capable of higher power and multi-channel OFDMA. The second radio transceiver 412 may be a radio transceiver capable of providing LTE UE functionality. Both transceivers 410 and 412 are capable of receiving and transmitting on one or more LTE bands. In some embodiments, either or both of transceivers 410 and 412 may be capable of providing both LTE eNodeB and LTE UE functionality. Transceiver 410 may be coupled to processor 402 via a Peripheral Component Interconnect-Express (PCI-E) bus, and/or via a daughtercard. As transceiver 412 is for providing LTE UE functionality, in effect emulating a user equipment, it may be connected via the same or different PCI-E bus, or by a USB bus, and may also be coupled to SIM card 418.

SIM card 418 may provide information required for authenticating the simulated UE to the evolved packet core (EPC). When no access to an EPC is available, a mini-EPC within device 400 may be used, or a mini-EPC located within the confines of the mesh network. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

In some embodiments, one or both radio transceivers may be modems on daughtercards that snap into the main device, henceforth referred to as UE modules. The UE modules may be Peripheral Component Interconnect Express Mini (PCI Express Mini) card modules, or may be M.2 form factor modules. The UE modules may plug into a PCI Express Mini interface electrically connected to processor 402 and baseband processor 406.

The UE modules may include dual-carrier or single-carrier support. Frequency division duplex (FDD), time division duplex (TDD), or both may be supported on each UE module. 2G quad-band, 3G wideband code division multiple access (WCDMA), Enhanced Data Rates for GSM Evolution (EDGE), or other 2G, 3G, 4G, or 5G standards may be supported.

Each UE module may support one or more frequency bands. For example, one UE module may provide LTE band 3 support and another UE module may provide LTE band 14 support. UE modules may be mixed and matched by a manufacturer or operator or reseller to provide different band support. As the LTE UE modules interoperate to a single standard, only minor configuration changes may be required to perform the methods described herein using UE modules on different LTE bands.

The UE modules may each provide a SIM card interface for enabling each modem to authenticate as a UE to the core network. Each UE module may independently handle UE functionality, requiring little support or processing from the baseband processor 406, and only requiring configuration using, for example, an AT command set protocol.

In some embodiments, one or both of the UE modules may be configured to support LTE-Advanced carrier aggregation. Using carrier aggregation, multiple bands or carriers may be ganged together to provide a single, higher-speed connection. For example, a UE module may support 2×10 MHz carrier aggregation (CA) or 2×20 MHz CA, providing double the performance. CA may be used on the uplink or the downlink. CA may be used in particular for a backhaul modem. CA may be used in particular for increasing downlink performance in the situation described herein wherein two base stations determine that increased downlink performance is required; CA may be used in place of the method described herein, in some embodiments, or CA may be used in addition to the method described herein (as CA stacks cumulatively with the approach described herein). CA may be used for FDD or TDD bands.

In some embodiments, the modules may include global positioning system (GPS), global navigation satellite system (GLONASS), or other positioning functionality in silicon, to be connected to antennas on the exterior of the base station. In some embodiments, the base stations may include a timing source for providing synchronization to the base station with respect to the core network; in some embodiments the timing source may be IEEE 1588 compliant, or may be a GPS module used as a timing source.

Wired backhaul 416 may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 410 and 412, which may be Wi-Fi 802.11a/b/g/n/ac, Bluetooth, ZigBee (used for low speed communications between mesh nodes), microwave (including line-of-sight microwave), or another wireless backhaul connection. Any of the wired and wireless connections may be used for either access or backhaul, according to identified network conditions and needs, and may be under the control of processor 402 for reconfiguration.

Operation

In operation of device 400, processor 402 may identify the appropriate network configuration, and may perform routing of packets from one network interface to another accordingly. Processor 402 may use memory 404, in particular to store a routing table to be used for routing packets. Baseband processor 406 may perform operations to generate the radio frequency signals for transmission or retransmission by both transceivers 410 and 412. Baseband processor 406 may also perform operations to decode signals received by transceivers 410 and 412. Baseband processor 406 may use memory 408 to perform these tasks.

Figure 5:
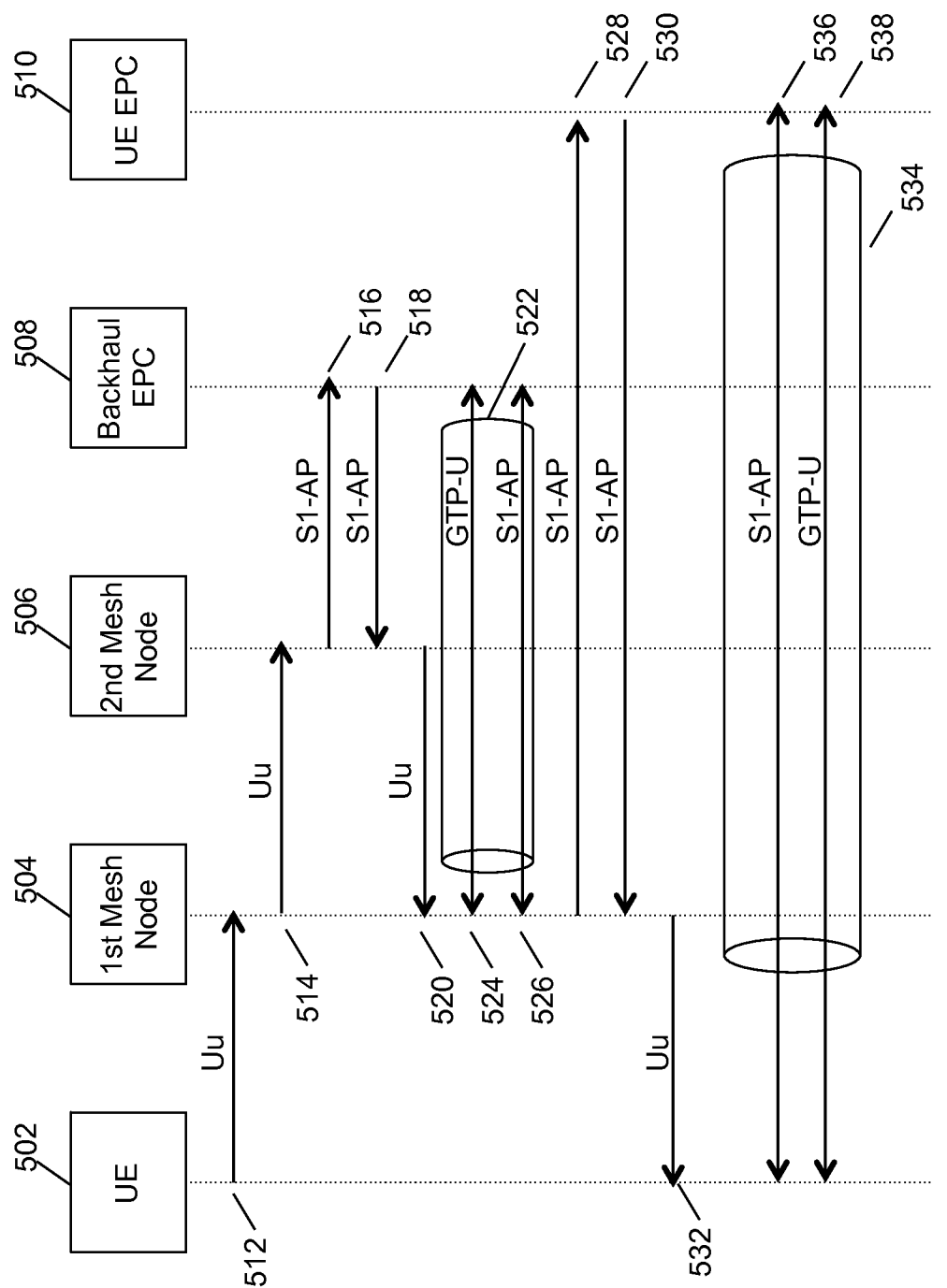
FIG. 5 is a signaling diagram depicting an exemplary message flow, in accordance with some embodiments.

FIG. 5 is a signaling diagram depicting an exemplary message flow in accordance with some embodiments. Signals between user equipment 502, a first mesh node 504, a second mesh node 506, a backhaul evolved packet core (EPC) 508, and a user equipment EPC 510 are described below. Signals are indicated as "Uu" to represent signals on the radio interface between the UE and an eNodeB functionality, as "S1-AP" for signals that are according to the S1 protocol between an eNodeB and an MME carrying control plane traffic, or as "GTP-U" for signals that are according to the GTP-U protocol between an eNodeB and a serving gateway (SGW) carrying user plane traffic. Steps may be omitted in the following discussion for clarity.

At step 512, user equipment 502 sends an attach request to first mesh node 504. Specifically, UE 502 sends this attach request to an eNodeB functionality at node 504. Node 504, however, has both a UE functionality and an eNodeB functionality. Second mesh node 506 also has a UE functionality and an eNodeB functionality. Node 504 relies on second mesh node 506 for backhaul, and specifically relies on an LTE connection with second mesh node 506. In order to establish this backhaul LTE connection, node 504, from its UE functionality, sends an attach message to the eNodeB functionality of node 506.

Node 506 receives the attach message and is then responsible for setting up the backhaul connection using the UE credentials of node 504. In order to do this, at step 516, node 506 acts as an eNodeB and forwards the attach request from node 504 to an MME in EPC 508, which will be called the backhaul EPC. The backhaul EPC may be a different EPC than the one intended for use by UE 502. Backhaul EPC may be an EPC of a service provider, such as AT&T, Verizon, or another LTE service provider. Backhaul EPC 508 may authenticate node 504 using the UE credentials of node 504, e.g., by using a home subscriber server (HSS) with a record of these credentials. The details of this authentication may be performed according to the LTE standard. At step 518, a successful authentication message is sent from EPC 508 to node 506, which passes this message along to node 504. At this point, the credentials of UE 502 have not yet been sent over the network.

At steps 524 and 526, a global packet radio service tunneling protocol (GTP) tunnel 522 is created between node 504 and backhaul EPC 508. This tunnel also passes through node 506. The tunnel includes user plane bearer 524 and control plane bearer 526. User plane bearer 524 provides a connection to the public Internet through a packet gateway (PGW) at backhaul EPC 508. This bearer is used to provide backhaul for node 504.

Once tunnel 522 and bearers 524 and 526 are established, node 504 is configured with a routing table as follows. For all traffic that should be sent to UE EPC 510, or to any external packet network (i.e., not to other UEs accessible from nodes 504 and 506, or other mesh network nodes, such as node 506), a route is created in the routing table on node 504 that places any such IP traffic onto bearer 524. In the case that multiple UEs are connected to node 504, any external IP traffic from any of those UEs may be placed onto bearer 524, including connection requests intended for EPC 510, such as request 512. The route may be identified or distinguished in the routing table using, in some embodiments, one or more of the GTP ID of the bearer, a hardware identifier for the LTE UE network interface at node 504, or another identifier.

Once the backhaul bearer 524 is established, first mesh node 504 may use this bearer to reach EPC 510, to provide access services to UE 502. At step 528, the attach message 512 received by node 504 is now forwarded to EPC 510, and authentication takes place within EPC 510. At step 530, confirmation of the authentication is returned to the eNodeB functionality of node 504, and at step 532, this is forwarded to UE 502. UE 502 is now enabled to access UE EPC 510.

At steps 536 and 538, a GTP tunnel 534 is created between node 504 and UE EPC 510, for encapsulating traffic to and from UE 502. UE EPC 510 may be a private EPC, or it may be another EPC of a service provider, or it may be the same EPC as backhaul EPC 508. Bearer 536 may be created between UE 502 and at least an MME (not shown) in UE EPC 510, for transferring control plane data, and bearer 538 may be created between UE 502 and at least an SGW (not shown) in UE EPC 510, for transferring user plane data. In some embodiments, tunnel 534 may be secured using Internet protocol security (IPSEC). In some embodiments, tunnel 534 may use IPv4, IPv6, or point-to-point protocol for transferring data. When using PPP, node 504 is enabled to provide authentication and other information needed for establishing the PPP connection.

Figure 6:
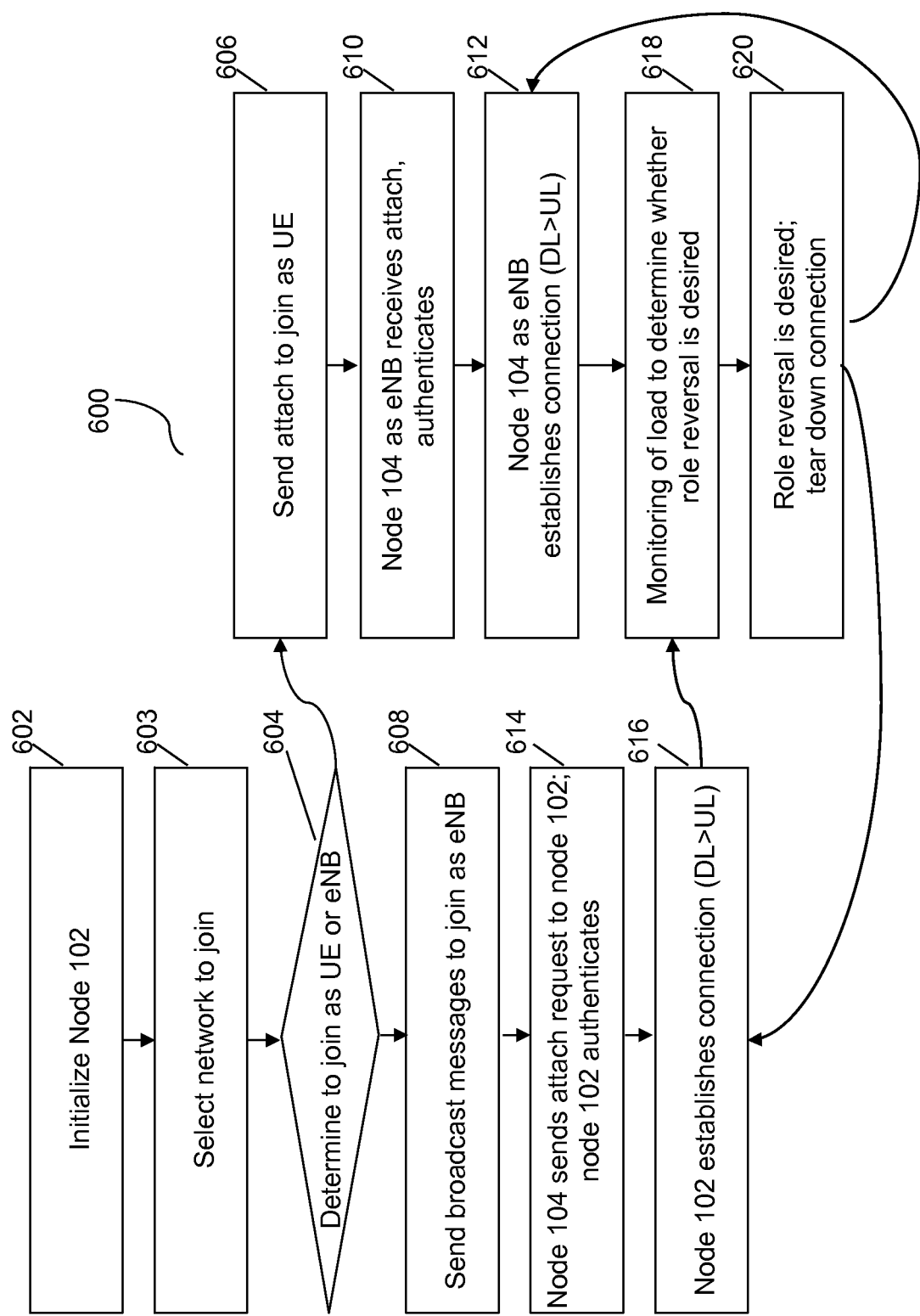
FIG. 6 is a flowchart depicting an exemplary method for operating the hardware depicted in FIG. 5, in accordance with some embodiments.

FIG. 6 is a flowchart depicting an exemplary method for operating the hardware depicted in FIG. 5, in accordance with some embodiments. Method 600 includes an initial attach 600*a* and a role switch 600*b*, each shown from the perspective of first mesh network node 102 in FIGS. 1 and 3. Not shown are attach and detach steps relating to the association and dissociation of UEs 108 with network node 102, which may occur at any time during the process shown, but it is assumed that there is at least one UE attached to network node 102.

At step 602, network node 102 is turned on and performs initial configuration. During step 602, node 102 may perform a network sniffing or scanning operation, to determine what other networks and mesh network nodes are in its vicinity. Sniffing or scanning may include receiving and interpreting timing and synchronization messages from eNodeBs according to the LTE standard, as well as radio resource control (RRC) information that is broadcast from eNodeBs for identifying available radio frequency bands. Sniffing or scanning may use either or both of network node 102's two radio interfaces.

After sniffing or scanning, node 102 may provide the output of the scan to network selection code for selecting a given mesh node in its vicinity to attempt connection. In some embodiments, the initial network selection code may look for the network node with the lowest cost backhaul route, taking into account parameters that may include latency, received signal strength indications (RSSIs), and other parameters. A low latency and a high RSSI may be preferred. In the case of network node 102 as shown in FIG. 1, it identifies second mesh network node 104 for connection at step 603, as it is nearby and as it has a reliable, low-latency backhaul connection. In some embodiments, the network node is selected based on information received from a cloud coordination server (UniCloud).

At step 604, node 102 processes the broadcast information from the eNodeB received at step 602 and assesses whether to join as a UE or as an eNodeB. The determination performed in step 604 may be based on a number of parameters, which may include: the total aggregate uplink and downlink bandwidth used by all UEs attached to node 102; the total aggregate bandwidth within a particular time window or averaged over a particular time window; latency characteristics of all links, including all backhaul links known to node 102; load characteristics of node 102, including processor 502 load; load characteristics of any links that are visible to node 102; load characteristics of other nodes or links that are known; time of day and day of week, which may affect load; specific UE identifiers for providing improved or degraded service to particular individuals; or other factors. If it is determined that greater total bandwidth (based on aggregate bandwidth over a particular time window) is desired for downlink than for uplink, at step 606, node 102 will attempt to join as a UE, and will create and send an attach message to eNodeB 104 using UE functionality built into node 102.

At step 610, the attach message is received by eNodeB 104, which returns an attach accept message and a RRC configuration message. The eNodeB may, in some embodiments, authenticate node 102 using the IMEI and IMSI stored in the UE transceiver's SIM card. In some embodiments, authentication may first be attempted via the backhaul connection to the EPC, or alternately, or in the case that authentication fails, authentication can be performed on a limited basis using a local EPC cache. At step 612, an LTE connection between node 102 and 104 has been established with the path from node 104 to node 102 (downlink) being faster than the path from node 102 to node 104 (uplink). This is helpful in this case because node 104 has the backhaul connection, so that all downloads from destinations on the other side of the backhaul connection will be faster than uploads thereto.

If, however, at step 606, node 102 determines that greater bandwidth is desired for uplink, at step 608, node 102 prepares to join as an eNodeB, and to potentially take over one or more of the UEs attached to eNodeB 104; it does not send an attach message from the UE circuit, and instead may begin sending broadcast messages to other nodes, including eNodeB 104 and all UEs, as shown, indicating its role as an eNodeB. At step 614, node 102 receives an attach request from node 104 (and possibly from other UEs previously connected to node 102), and adds node 104 to the network. At step 616, an LTE connection between node 102 and 104 has been established with the path from node 102 to node 104 (downlink) being faster than the path from node 104 to node 102 (uplink).

At step 618, node 102 repeatedly performs monitoring of the load criteria described above, which may be continuous, polled at intervals, or any other method. Load may refer to network load, processor load, baseband processor load, radio resource load, or any other type of load, and may refer to load that is on node 102, or on an air link connected to node 102, or load on another resource. Step 618 may take place on the mobile device itself, in some embodiments, or on a remote network node or cloud server, or it may connect to a UniCloud server device to obtain approval from the central coordination server. Step 618 identifies, in particular based on desired aggregate uplink and downlink bandwidth, as described above with respect to step 604, whether role reversal is currently desired. At step 620, it has been identified that role reversal is desired, which may cause the existing LTE connection between node 102 and 104 to be torn down, and which may cause a new LTE connection to be established according to either of steps 612 or 616.

Alternative Embodiments

In some embodiments, coordination may be performed between mesh nodes, so that when one node (or a cloud server) determines that a role reversal is needed, both nodes may immediately perform the role reversal. Coordination may be provided by a direct control channel or control connection between the nodes, in some embodiments, which may be a channel according to the 3GPP X2 protocol, or in a preferred embodiment, by an out-of-band X2 connection to a coordination node, which may be identified as UniCloud. UniCloud may perform other coordination functions, such as coordinating radio spectrum allocation and signal strength among mesh network nodes. Each mesh network node may have its own X2 connection to UniCloud, and UniCloud may send instructions to the mesh network nodes to cause them to be reconfigured. UniCloud is valuable in that it may be enabled to coordinate among more than two nodes, and may thus facilitate the formation of a mesh network more quickly than a mesh network that relies purely on cooperative configuration strategies, like voting. The UniCloud may perform coordination by specifically sending instructions to one or more network nodes to initiate a network change, by approving requests sent by one or more network nodes, or a combination of both.

An example of the utility of the UniCloud is as follows. In a network configuration where more than one mesh node has attached UEs, it may be more difficult to determine whether role reversal is desired because each mesh node has information about throughput (uplink/downlink data) demands of each of its own UEs, but not of UEs attached to other mesh nodes. A UniCloud implementation can determine an improved network flow based on aggregating throughput over all connected UEs throughout the mesh network.

Another example of the utility of the UniCloud is as follows. When more than one network node has a backhaul connection, it can be difficult for a plurality of self-organizing network nodes to determine an efficient routing that attempts to maximize use of all backhaul connections. UniCloud may be able to do so by splitting the mesh network into zones and instructing particular network zones to use routing algorithms to share the particular backhaul connection closest to that zone, including a role reversal if necessary.

In some embodiments, UniCloud may help identify which nodes should use local breakout, which is defined as the use of a backhaul connection by a mesh network node without routing traffic to other mesh network nodes. Local breakout may be used without UniCloud as well, in some embodiments, and algorithms may be implemented on each network node to determine when local breakout should be used. Characteristics that could be used for determining whether to use local breakout may include route, load, traffic type (e.g., voice or video), or other factors. However, UniCloud may assist by splitting the mesh network into zones, as above, so that local breakout becomes a special case of the shared backhaul scenario described in the previous paragraph. In some embodiments, UniCloud may divide bandwidth between backhaul and access uses, or may broker bandwidth negotiations between mesh nodes if negotiation is being used in a self-organizing network.

In some embodiments, frequency interworking may be provided using the two included LTE radio transceivers within the device 400. While in the preceding disclosure, it has been assumed that both the eNodeB radio transceiver and the UE radio transceiver may be using the same designated LTE frequency band (such as LTE Band 14 for public safety, or LTE Band 13 for U.S.-based Verizon Wireless deployments), it is not necessary for the same band to be used. As an example of the use of two different bands, it is contemplated that a mesh network may be formed by a network node with the eNodeB transceiver on LTE Band 14 for a public safety application, such that all UEs are attached on Band 14, but with the UE transceiver in the same network node set to use LTE Band 13 to connect to a Verizon Wireless LTE eNodeB for providing backhaul to the Band 14 network. Data flowing on such a secondary LTE backhaul link may be secured, in order to avoid interception while passing through the commercial LTE network's radio access network and packet core before reaching the UniCloud and/or the desired EPC core. Other frequency interworking combinations are also contemplated.

In some embodiments, it may be possible to reduce the likelihood that the LTE UE being used to create a backhaul connection connects to an LTE eNodeB found in the same base station that is being used for access by other UEs, or an LTE eNodeB in another mesh base station that will not be useful for establishing a backhaul connection. One technique for doing so is as follows. The LTE UE has an identifier, which may be a built-in international mobile subscriber identity (IMSI), as a result of the use of a standard UE with SIM card. The identifier may be used to determine which UEs are being used for creating a backhaul connection. In some embodiments, other identifiers, such as international mobile equipment identities (IMEIs) or global unique temporary identifiers (GUTIs), may be used.

When the LTE UE connects to an eNodeB, the UE sends its MEI or IMSI to the eNodeB in the initial attach message. The eNodeB may determine, based on the MEI or IMSI, that the UE is a special UE, and may then cause the UE to be released without performing the steps involved in an ordinary attach procedure. For example, instead of sending the UE attach request to the MME, the eNodeB may respond to the UE attach message with a radio resource control (RRC) connection release message to the UE.

Prior to use, the IMEIs or other identifiers may be registered at a mesh node. In some embodiments, the mesh node may include a home subscriber server as part of a mini-evolved packet core (mini-EPC), which may be used to register the identifier. Upon an attach request, the IMEI will be queried at the HSS, which will result in a profile being retrieved from the HSS and propagated by the MME to the eNodeB functionality of the mesh network node. This profile may result in disconnection if the IMEI is determined to be an undesirable IMEI, e.g., if the UE in question should attempt to connect to another eNodeB, not the eNodeB at the particular mesh network node.

When the LTE UE connects to an eNodeB, the UE sends its MEI or IMSI to the eNodeB in the initial attach message. The eNodeB may determine, based on the MEI or IMSI, that the UE is a special UE, and may then cause the UE to be released without performing the steps involved in an ordinary attach procedure. For example, instead of sending the UE attach request to the MME, the eNodeB may respond to the UE attach message with a radio resource control (RRC) connection release message to the UE.

The RRC connection release message may include the following information elements (IEs): (i) Redirection carrier information, about which frequency the special UE should use to connect to another, more-appropriate connection for the backhaul connection; (ii) New cell selection priorities in a FreqPriorityListX, listing either specific eNodeBs or tracking areas, such that the UE does not attempt to connect to another access functionality of the same or another mesh network node, but instead attempts to connect to a node providing backhaul; and (iii) increase the T320 timer such that the configuration sent in (i) and (ii) is valid for a relatively long period, such as a few hours, before the UE attempts to connect again to the LTE eNodeB of the same base station. This technique may thus be called backhaul persistence, in some embodiments. This technique may also be used to reduce such connections between backhaul-type UEs and any other eNodeBs deemed to not provide an effective backhaul path.

In some embodiments, the HSS and MME in the commercial operator's network may be used to provision this information. In other embodiments, the IMEI may be used directly, without provisioning a profile from an HSS to an MME. In some embodiments, the policy may include an information element with a particular secret value. Any arbitrary value could be chosen. For example, the information element "download/upload max rate limit" may be set to the value "1234567" to cause automatic disconnection of the UE.

In some embodiments, attach messages from a UE may be encrypted and may not be detectable at an eNodeB without decryption. However, when the IMSI is not detectable by the eNodeB functionality of the mesh network node, a timeout could be used to cause the UE to re-send an attach message that is not encrypted. In another embodiment, a keep-alive ping or other technique could be used to prevent a UE from going IDLE, thereby avoiding the encrypted attach messages. In another embodiment, special UE configuration may cause attach requests to be made non-encrypted when the mesh node UE is performing an attach.

In some embodiments, new cells that may form the access side for a backhaul UE can be configured or detected through a network monitor mode (NMM mode). NMM mode is a mode that may be supported by some eNodeBs that permits cell RF configuration, carrier and cell ID selection, querying of carrier signal strength, listing of carriers or cells, and other configuration operations to be performed by the eNodeB. NMM mode may be used on the mesh network node with the eNodeB functionality to detect new cells as they appear, in some embodiments. The detected new cells may be used by the eNodeB to create an appropriate frequency priority list for the UE, as described above.

In other embodiments, NMM mode may be used to scan for bands that are not in use, and then to set up a particular eNodeB on such a band. The backhaul UE may be enabled to select these particular eNodeBs instead of the eNodeB built into the co-located mesh network node itself, in some embodiments, either by identification of these eNodeBs in a FreqPriorityListX information element as described above or using other methods. In other embodiments, the backhaul UE may be configured to avoid mesh network node eNodeBs via prior configuration, via a connection from a cloud configuration server, via hard-coding, e.g., to avoid the single eNodeB with the strongest signal strength, or via another means. In other embodiments, the specific tracking area of the particular eNodeB to be avoided may be added to the list of forbidden tracking areas for roaming, as described in further detail in 3GPP TS 23.122 § 3.1.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the out-of-band channel may be implemented over a virtual channel over the public Internet.

The invention claimed is:

1. A first base station comprising:
  a first radio transceiver configured to receive attach requests from a plurality of mobile devices using an asymmetric wireless protocol;
  a second radio transceiver in communication with a third base station functioning as a relay between the first base station and a second base station, the second radio transceiver configured to attach to the second base station as an associated mobile device of the second base station using the asymmetric wireless protocol to create an existing link;
  a subscriber identity card coupled to the second radio transceiver; and
  a processor configured to route requests for data from the plurality of mobile devices through the second radio transceiver, wherein the second base station provides gateway functionality for the first base station toward a core network, wherein the processor is further configured, if a desired uplink speed towards the core network exceeds an uplink speed of the existing link, to permit the second base station to attach to the first base station via the first radio transceiver as an associated mobile device of the first base station, and to reconfigure the second radio transceiver to detach from the second base station, thereby creating a new link and increasing available uplink speed from the first base station to the second base station relative to the uplink speed of the existing link, and wherein the first radio transceiver is configured to enable aggregation of a plurality of carrier bands for the new link.

2. The first base station of claim 1, wherein the processor is further configured to cause the second radio transceiver to attach to the second base station or to cause the first radio transceiver to receive attach requests from the second base station, based on a switching parameter.

3. The first base station of claim 1, further comprising an X2 control channel connection between the first base station and a cloud coordination server, and wherein the asymmetric wireless protocol is a Long Term Evolution (LTE) protocol, the first base station is an LTE eNodeB, and the subscriber identity card is a subscriber identity module (SIM) card.

4. A method comprising:
receiving, at a first network node, an attach message from a mobile device;
selecting a nearby available network node as a second network node based on an operational characteristic;
selecting another nearby available node as a third network node functioning as a relay between the first network node and the second network node;
evaluating at least one traffic parameter to determine a role of the first network node for relating to the second network node;
sending an attach message from the first network node to the second network node based on evaluation of the at least one traffic parameter;
setting up an uplink Internet Protocol (IP) session from the first network node to the second network node, with the role of the first network node being a user equipment (UE) role;
relaying IP packets from the mobile device to a core network via the second network node;
tearing down the uplink IP session and receiving an attach message from the second network node at the first network node for setting up a downlink IP session from the first network node to the second network node, with the role of the second network node being a UE role; and
enabling aggregation of a plurality of carrier bands for the downlink IP session.

5. The method of claim 4, further comprising receiving measurement reports from the mobile device for generating the traffic parameter.

6. A system comprising:
a first base station, further comprising:
a first radio transceiver configured to receive attach requests from a plurality of mobile devices using an asymmetric wireless protocol,
a second radio transceiver,
a subscriber identity card coupled to the second radio transceiver, and
a processor configured to route requests for data from the plurality of mobile devices through the second radio transceiver;
a second base station, in communication with a third base station functioning as a relay between the first base station and the second base station, the second base station further comprising:
a first radio transceiver,
a second radio transceiver, and
a subscriber identity card coupled to the second radio transceiver; and
a cloud coordination server coupled to the first base station via a first communication channel and coupled to the second base station via a second communication channel, the cloud coordination server configured to:
monitor aggregate bandwidth parameters of the first and the second base station, the aggregate bandwidth parameters including a desired uplink speed from the first base station to a core network with an available downlink speed of an existing link and an available uplink speed of the existing link, and
coordinate a role reversal of the first base station and the second base station via attachment of the second base station to the first base station in a UE role based on the monitored aggregate bandwidth parameters.

7. The method of claim 4, further comprising determining whether to connect to the second network node in a UE role or in an eNodeB role using the monitored aggregate bandwidth parameters.

8. The method of claim 4, wherein the aggregate bandwidth parameters further comprise at least one of: a latency between the first network node and the second network node; a backhaul cost for backhauling traffic via the first network node; a backhaul cost for backhauling traffic via the second network node; a signal quality of an access network of the first network node; and a signal quality of an access network of the second network node.

9. The method of claim 4, further comprising:
reevaluating, at the first network node, at least one traffic parameter to determine the role of the first network node for relating to the second network node; and
receiving, at the first network node, an attach message from the second network node for setting up a second IP session, with the second network node operating as a user equipment,
wherein the at least one traffic parameter indicates that a greater amount of bandwidth is desired for IP traffic from the first network node to the second network node relative to IP traffic from the second network node to the first network node.

10. The method of claim 4, further comprising considering a time of day or a day of a week to connect to the second network node in a UE role.

11. The method of claim 4, further comprising evaluating a network load and a radio resource load at the first network node to connect to the second network node in a UE role.

12. The system of claim 6, wherein the first base station communicates to the second base station and to the cloud coordinating server using an X2 protocol.

13. The system of claim 6, wherein the cloud coordination server is further configured to analyze route and traffic type to determine a need for local breakout at the first base station.

14. The system of claim 6, the cloud coordination server further configured to coordinate aggregation of a plurality of carrier bands for a downlink connection from the first base station to the second base station.

15. The system of claim 6, the cloud coordination server further configured to monitor one or more of: latency; a received signal strength indicator (RSSI); network load; processor load; baseband processor load; radio resource load; and desired aggregate uplink or downlink bandwidth.

16. The system of claim 6, wherein the cloud coordination server is further configured to:
   create a zone of mesh network nodes comprising the first base station, the second base station, and a third base station, the zone in communication with a core network via a backhaul link;
   monitor aggregate bandwidth parameters from the first, second, and third base stations; and
   analyze the aggregate bandwidth parameters with respect to the zone of mesh network nodes to determine whether a role reversal of any of the mesh network nodes is necessary to increase utilization of the backhaul link.

17. The system of claim 16, the cloud coordination server further configured to monitor latency between the first base station and the second base station and latency between the first base station and the third base station.

* * * * *